United States Patent [19]

Katsuoka

[11] Patent Number: 4,527,831
[45] Date of Patent: Jul. 9, 1985

[54] MOTORCYCLE

[75] Inventor: Tatsuzo Katsuoka, Hamamatsu, Japan

[73] Assignee: Yamaha Hatsudoki Kabushiki Kaisha, Japan

[21] Appl. No.: 390,375

[22] Filed: Jun. 21, 1982

[30] Foreign Application Priority Data

Jul. 1, 1981 [JP] Japan ................................ 56-101253

[51] Int. Cl.³ .............................................. A47C 15/00
[52] U.S. Cl. ..................................... 297/243; 297/201; 297/345
[58] Field of Search .............. 297/243, 195, 338, 345, 297/312, 201, 236, 338, 345, DIG. 9

[56] References Cited

U.S. PATENT DOCUMENTS

| 510,993 | 12/1893 | Riess | 297/195 |
| 588,932 | 8/1897 | Stanton | 297/236 |
| 1,881,136 | 10/1932 | Schmidt | 297/201 |
| 1,948,786 | 2/1934 | Dorrell | 297/232 X |
| 2,743,766 | 5/1956 | Bartman | 297/232 X |
| 3,913,974 | 10/1975 | Bowen | 297/DIG. 9 |

FOREIGN PATENT DOCUMENTS 371314 10/1923 Japan .
4429929 3/1966 Japan .

*Primary Examiner*—James T. McCall
*Attorney, Agent, or Firm*—Ernest A. Beutler

[57] ABSTRACT

A seat arrangement for a motorcycle in which the passenger seat is adjustable relative to the driver's seat so as to increase the view of a passenger.

7 Claims, 5 Drawing Figures

MOTORCYCLE

BACKGROUND OF THE INVENTION

This invention relates to a motorcycle and more particularly to an improved seating arrangement for such a vehicle.

In motorcycles equipped with rear seats for passengers, the rear seat is normally placed at approximately the same level as the driver's seat. As a result, the passenger's line of vision is obstructed by the head of the driver. This not only decreased the passenger's enjoyment of riding on the motorcycle but also can make the passenger nervous during long trips.

It is, therefore, a principal object of this invention to provide an improved seating arrangement for a motorcycle.

It is another object of the invention to provide a motorcycle seating arrangement wherein the passenger may alter or adjust his seating position.

It is a still further object of the invention to provide a motorcycle seating arrangement wherein the passenger is afforded a greater view than with conventional prior art seating arrangements.

SUMMARY OF THE INVENTION

This invention is adapted to be embodied in a motorcycle seating arrangement comprising a front and a rear seat. In accordance with the invention, the rear seat is supported for vertical adjustment relative to the front seat.

DETAILED DESCRIPTION OF THE PREFERRED EMBODIMENT

Figure 1:
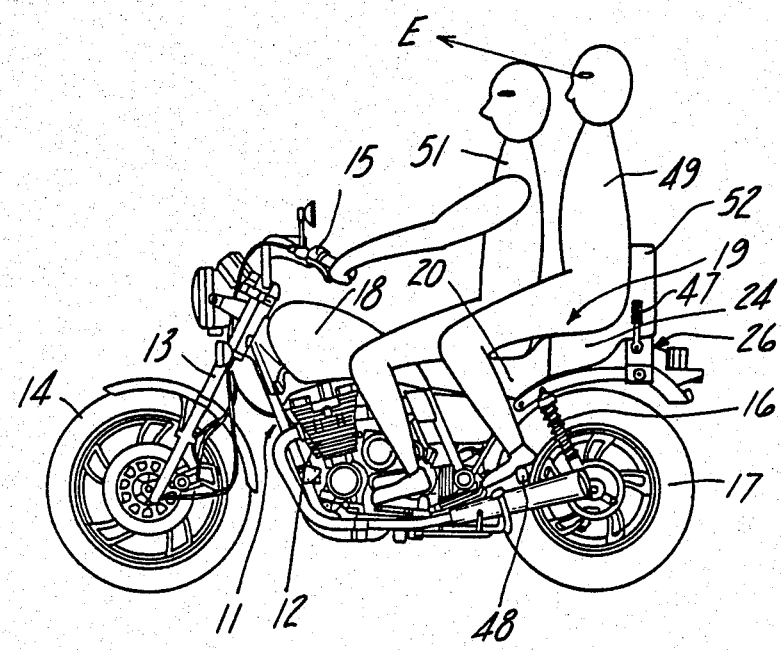
FIG. 1 is a side elevational view of a motorcycle constructed in accordance with this invention.
Figure 2:
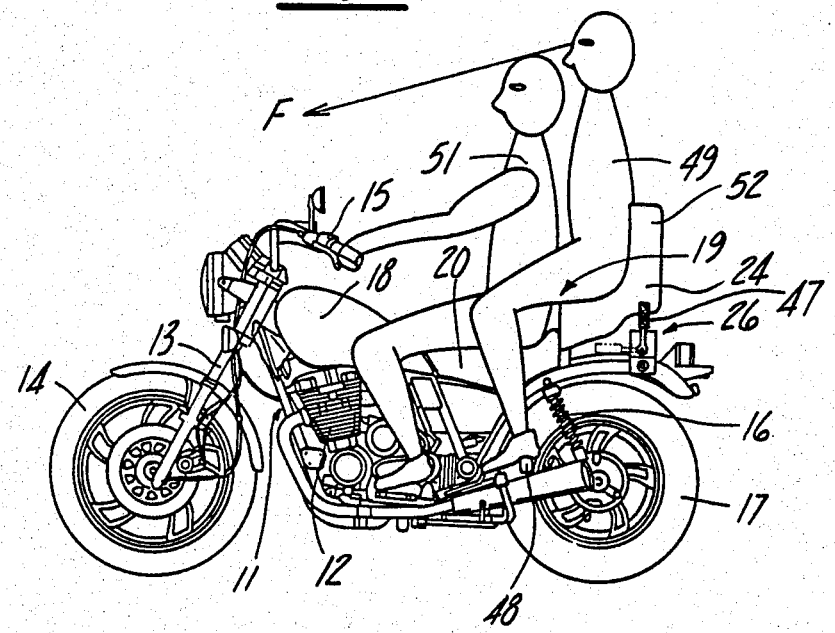
FIG. 2 is a side elevational view, in part similar to FIG. 1, showing the rear seat adjusted to another position.

Referring first to FIGS. 1 and 2, a motorcycle embodying this invention includes a frame assembly, indicated generally by the reference numeral 11. An engine and transmission assembly 12 is supported by the frame assembly 11 in a known manner. A front fork 13 rotatably journals a front wheel 14 and may be steered in a known manner by means of handlebar assembly 15. A suspension system 16 supports the driven rear wheel 17 also in a known manner.

A fuel tank 18 is supported at the forward end of the frame assembly 11 immediately beneath the handlebar 15. To the rear of the fuel tank there is supported a seat assembly constructed in accordance with this invention, which seat assembly is identified generally by the reference numeral 19.

Figure 3:
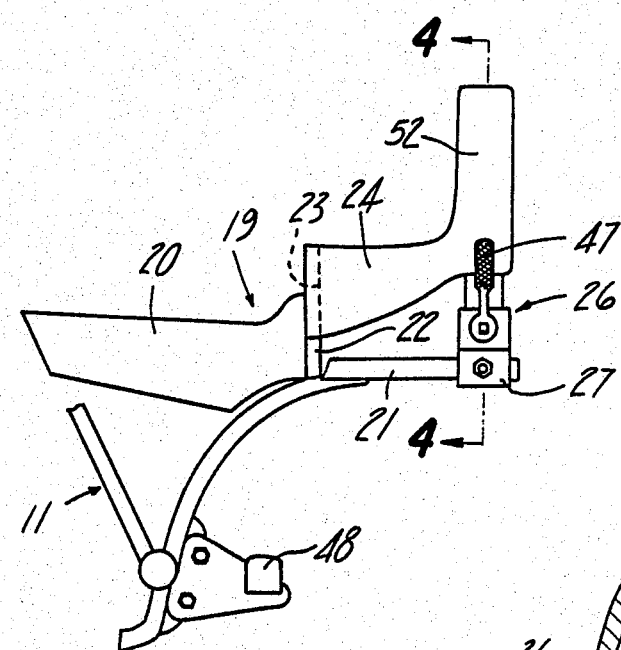
FIG. 3 is an enlarged side elevational view showing the seat assembly and its mounting arrangement.
Figure 4:
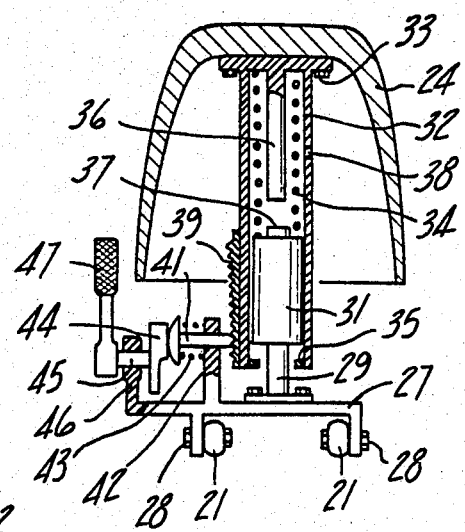
FIG. 4 is a further enlarged cross-sectional view taken along the line 4—4 of FIG. 3.
Figure 5:
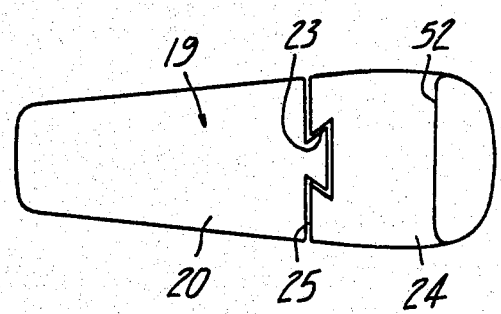
FIG. 5 is a top plan view of the seat assembly.

The construction of the seat assembly 19 may be best understood by reference to FIGS. 3 through 5. The seat assembly 19 includes a forward driver's portion 20 that is affixed to the frame 11 in proximity to a frame seat rail 21. The driver's seat portion 20 is formed with a dovetailed part 22 that is received in a complementary groove 23 of a passenger seat portion 24. The groove 23 is formed in a forward face 25 of the passenger's seat portion 24.

The passenger's seat portion 24 is supported on the seat rail 21 for vertical adjustment by means of a mounting, adjusting and locking portion indicated generally by the reference numeral 26. The mounting and locking portion 26 includes a supporting bracket 27 that is affixed to the seat rails 21 in a suitable manner, as by bolts and nuts 28. The bracket 27 mounts a vertically-extending post 29 having an enlarged cylindrical portion 31. A generally cylindrical member 32 has a bore that is slidably supported on the cylindrical portion 31. The cylindrical member 32 is affixed to the rider's seat portion 24 by means of bolts or the like 33. A coil compression spring 34 is contained within the member 32 and engages its underside and the upper end of the cylindrical portion 31 so as to urge the rider's seat portion 24 upwardly. This upward motion is limited by an inwardly-extending flange member 35 that is affixed to the lower end of the cylindrical member 32 and which is adapted to engage the cylindrical portion 31 to limit the maximum extent of upward movement.

The downward movement of the seat portion 24 is limited by the contact of a rod 36 that depends downwardly through the bore of the cylindrical member 32 and which is adapted to engage a resilient stop 37 provided at the upper end of the cylindrical member 31.

The cylindrical member 31 is closely fitted within the bore of the cylindrical member 32. An orifice 38 is formed in the wall of the cylindrical member 32 so that movement of the seat portion 24 either upwardly or downwardly is damped by the restricted flow of air through the orifice 38.

The passenger's seat portion 24 is locked in position by means of a locking mechanism including a rack-like member 39 that is affixed to one side of the cylindrical member 32. A locking plunger 41 is slidably supported in a bore in an upstanding flange 42 of the bracket 27 and is adapted to engage the rack-like member 39 so as to lock the seat portion 24 in the selected adjustment position. The locking member 41 is normally urged toward a release position by means of a coil spring 43 that encircles the member and bears against its head and the flange 43.

An operating cam 44 is affixed to a shaft 45 which is, in turn, pivotally supported in a flange 46 of the bracket 27 that is parallel and spaced outwardly of the flange 42. An operating handle 47 is affixed to the outer end of the shaft 45 so that it may be rotated. The cam 44 is configured so that when the handle 47 is in an upright position as shown in the drawings, that the locking pin 41 will be held in engagement with the teeth of the rack-like member 39 in opposition to the spring 43. When the handle 47 is rotated forwardly through 90° to the broken line position shown in FIG. 2, the configuration of the cam 44 is such that the spring 43 will urge the locking pin 41 free of engagement with the rack-like member 39. The seat may then be adjusted in the manner to be described.

A pair of foot rests 48 are affixed to the lower portion of the frame 11 and are positioned so that a passenger, indicated by the reference numeral 49, may conveniently place his feet on these foot rests 48 and also to effect adjustment of his seat portion 24. As seen in FIG. 1, when the seat portion 24 is positioned in its lowermost position, the passenger 49 has a limited line of sight relative to the driver 51 only in the direction upwardly as indicated by the arrow E. This would be the position the passenger would be in with a normal, prior art type of seating arrangement.

If the passenger 49 wishes to elevate the seat portion 24, he rotates the handle 42 ninety degrees (90°) in a counterclockwise direction as viewed in the figures to the dotted line position shown in FIG. 2. When this occurs, the pin 41 will be released from the rack 39. By lifting his weight off of the seat portion 24 using the foot rests 48, the spring 34 will urge the seat 24 upwardly. The action of the orifice 38 will retard the flow of air into the space of the cylindrical member 32 above the cylindrical member 31 and cushion or dampen this movement. When the seat is at a proper level, for example, so that the passenger 49 may look downwardly over the driver's head in the direction of the arrow F in FIG. 2, he can rotate the handle 47 back to bring the locking pin 41 into engagement with the rack-like member 39 and lock the seat portion 24 in position.

Adjustment in the downward direction is achieved by again releasing the handle 47 and employing the weight of the passenger 49 in opposition to the spring 34 to move the seat portion 34 downwardly. The orifice 38 will limit the air flow out of the area between the cylindrical members 32 and 31 and will dampen the downward movement. The seat may be again locked in its desired position by return of the handle 47 to its upright position.

In order to improve the comfort for the passenger 49, the seat portion 24 may be formed with a backrest 52. The backrest 52 can be formed integrally with the remaining portion of the seat 24. In addition, the forward face 25 of the seat portion 24 may be cushioned so that it itself acts as a back rest for the driver 51. The driver may employ this backrest with or without a passenger 49 by elevating the seat portion 24 himself.

It should be readily apparent that the described construction permits the passenger 49 to adjust the seat 24 even while the motorcycle is in operation to a suitable position. In addition, during long trips, the passenger may adjust the seat to change his riding position and avoid discomfort. Furthermore, the passenger may lower the seat portion 24 to facilitate getting on and off of the motorcycle.

Although an embodiment of the invention has been described, it is to be understood that various changes and modifications may be made without departing from the spirit and scope of the invention, as defined by the appended claims.

I claim:

1. In a motorcycle seating arrangement comprising a front seat providing a substantially horizontally extending seating surface of sufficient horizontal extent to seat a rider and a rear seat providing a substantially horizontally extending seating surface of sufficient horizontal extent to seat a passenger behind said rider, the improvement comprising said rear seat being supported for vertical adjustment relative to said front seat so as to raise and lower the seating elevation of a passenger seated on said rear seat relative to a rider seated on said front seat.

2. A motorcycle seating arrangement as set forth in claim 1 further including locking means for locking the rear seat in adjusted position relative to the front seat.

3. A motorcycle seating arrangement as set forth in claim 2 further including biasing means for biasing the rear seat to an extreme of its relative positions relative to the front seat.

4. A motorcycle seating arrangement as set forth in claim 3 further including shock absorbing means for retarding the movement of the rear seat relative to the front seat during its adjustment.

5. A motorcycle seating arrangement as set forth in any of claims 1 through 4 wherein the rear seat and front seat are interlocked for restrained movement therebetween in a direction normal to the direction of vertical adjustent.

6. A motorcycle seating arrangement as set forth in claim 5 wherein the leading edge of the rear seat is cushioned so as to function as a backrest for a driver on the front seat.

7. A motorcycle seating arrangement as set forth in claim 5 wherein the rear seat has a backrest portion.

* * * * *